United States Patent [19]

Castellucci

[11] Patent Number: 5,065,960
[45] Date of Patent: Nov. 19, 1991

[54] GAP FILLER FOR ADVANCED AIRCRAFT TO REDUCE RADAR DETECTABILITY

[75] Inventor: Nicholas T. Castellucci, San Pedro, Calif.

[73] Assignee: Northrop Corporation, Hawthorne, Calif.

[21] Appl. No.: 474,977

[22] Filed: Feb. 5, 1990

[51] Int. Cl.⁵ .............................................. B64C 1/06
[52] U.S. Cl. .................................... 244/131; 244/130; 244/132; 52/461; 296/93
[58] Field of Search ............... 244/130, 131, 132, 119; 52/465, 461, 464; 296/93, 213

[56] References Cited

U.S. PATENT DOCUMENTS

| 1,549,721 | 8/1925 | Kraft | 244/131 |
| 2,114,289 | 4/1938 | Draim | 244/131 |
| 2,375,951 | 5/1945 | Simon | 244/132 |
| 3,508,369 | 4/1970 | Tennison | 52/461 |
| 3,548,557 | 12/1970 | Downing, Jr. | 52/461 |
| 3,593,475 | 7/1971 | LaGue | 52/461 |

Primary Examiner—Galen Barefoot
Assistant Examiner—Christopher P. Ellis
Attorney, Agent, or Firm—Terry J. Anderson; Karl J. Hoch, Jr.; Robert B. Block

[57] ABSTRACT

Improved channel members positionable over and in the gaps between aircraft panels. Each channel member includes a gap filler including a horizontal portion extending across the gap and a vertical portion extending downwardly therefrom into a gap. The vertical portion has parts in frictional contact with the side walls of the gap to resist removal of the gap filler from the gap. The gap filler is formed of an electrically conductive material selected to preclude galvanic corrosion when in contact with the panels. The vertical portion is formed of a pair of downwardly extending legs integrally formed with the horizontal portion. A central extent of each vertical portion includes an outwardly directed bight in frictional contact with a side wall of an associate panel. The channel member further includes an upper horizontal component in contact with adjacent plates at their exterior surfaces. The upper horizontal component is fabricated of the same material as the panels.

15 Claims, 3 Drawing Sheets

Fig. 1
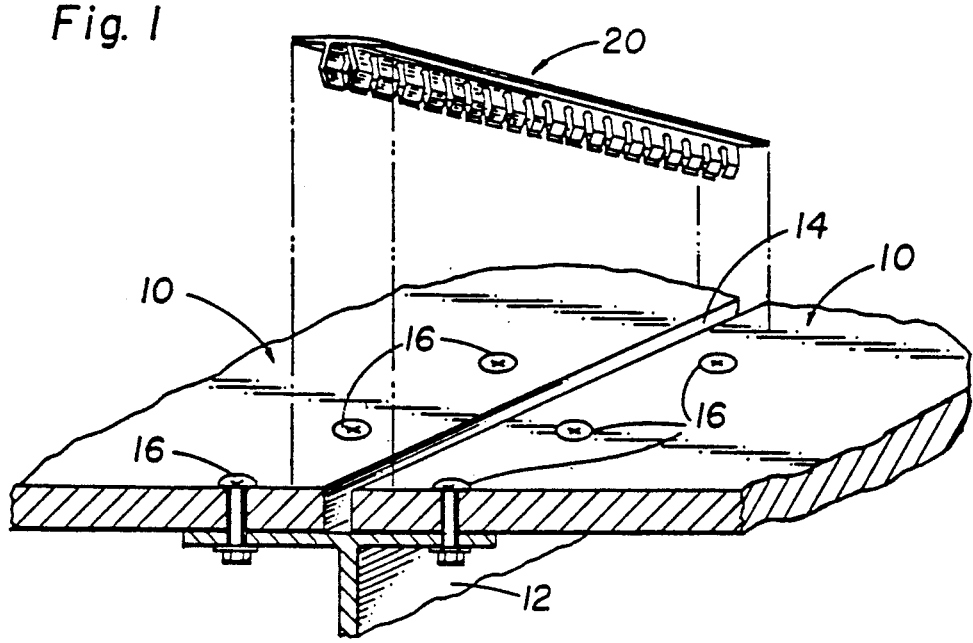
Fig. 2
Fig. 3
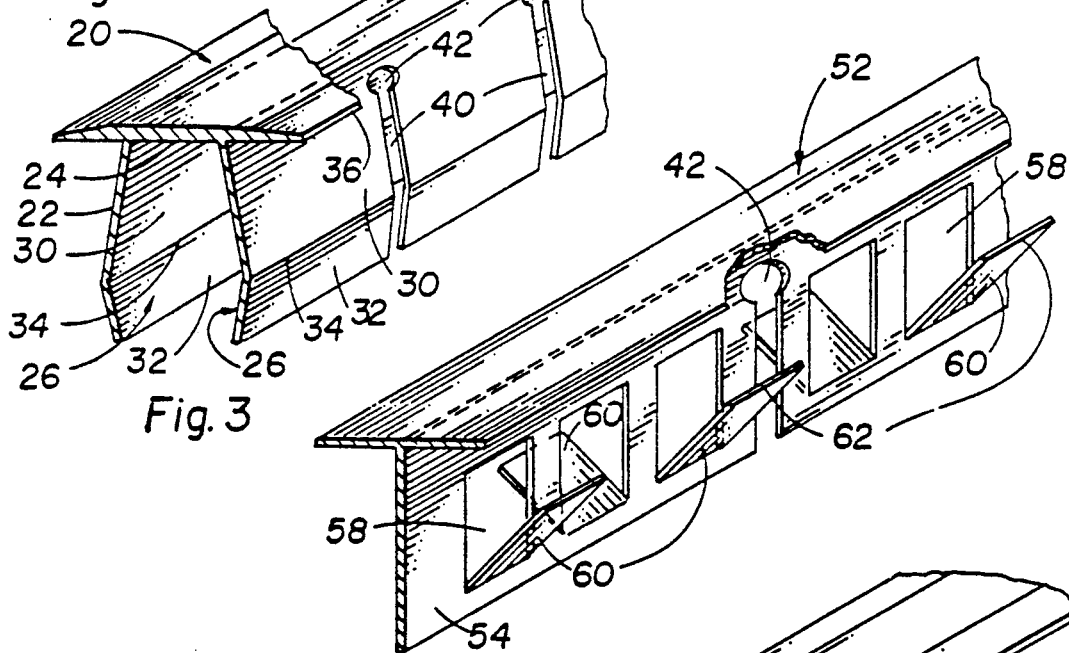
Fig. 4
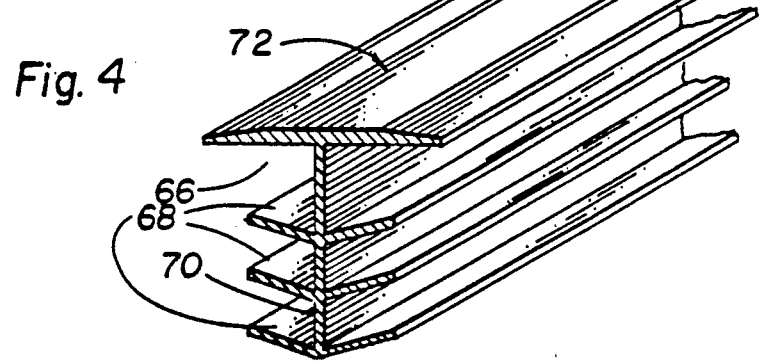

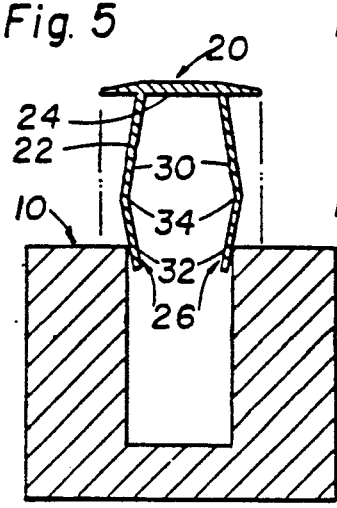
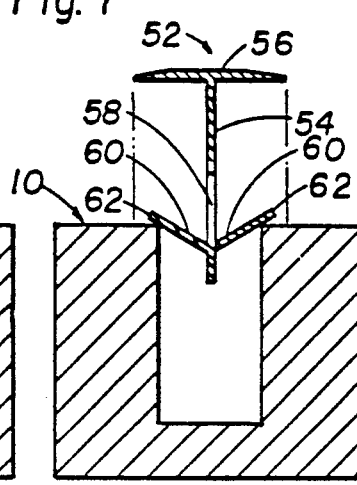
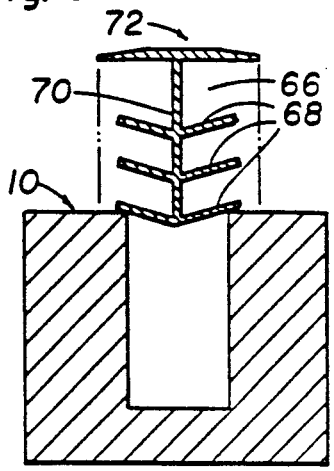
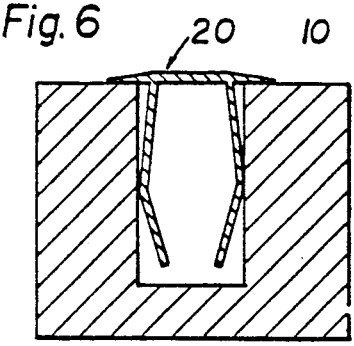
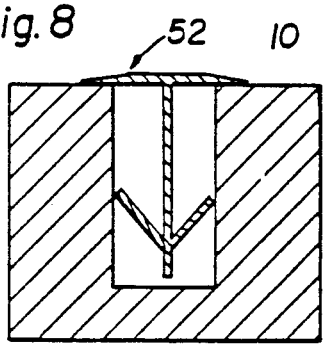
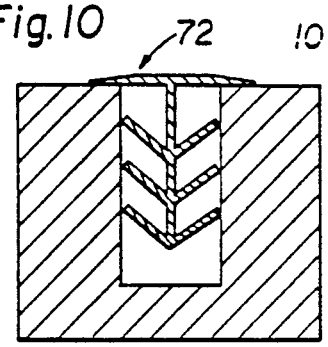
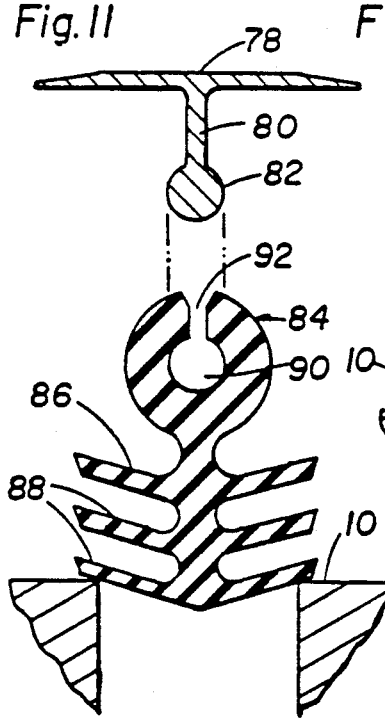
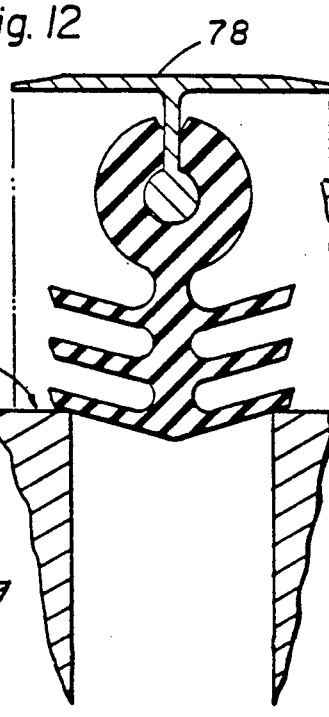
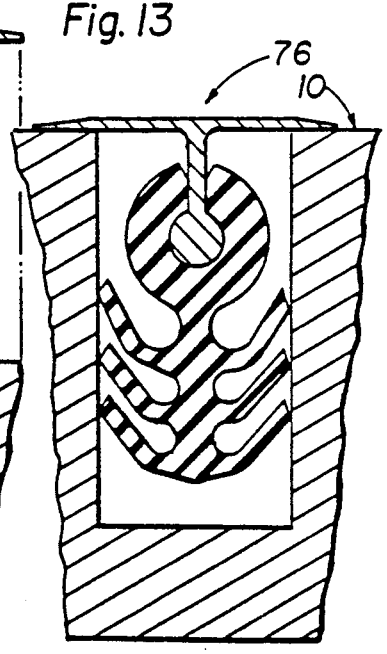

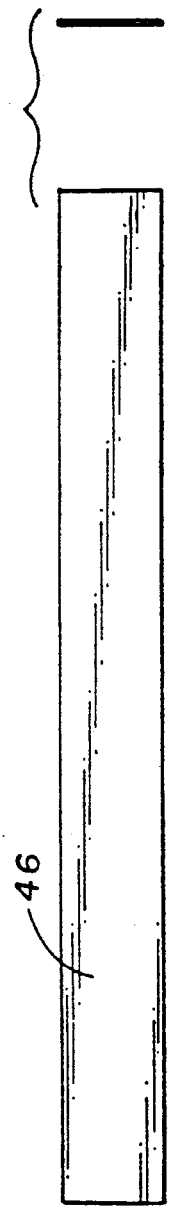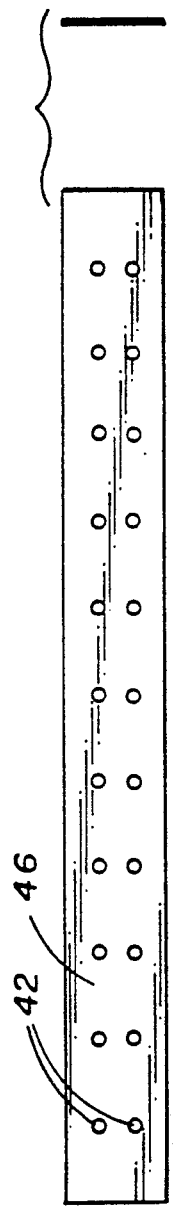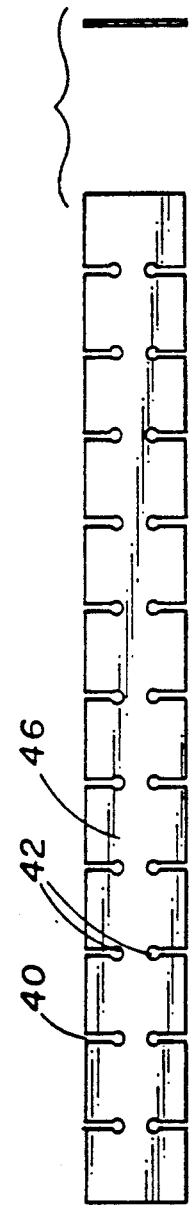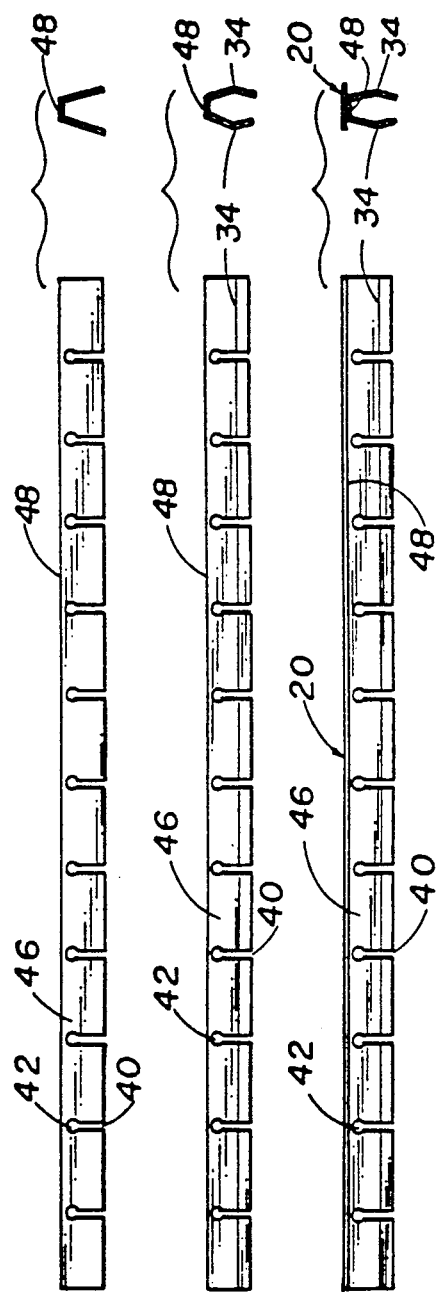

GAP FILLER FOR ADVANCED AIRCRAFT TO REDUCE RADAR DETECTABILITY

BACKGROUND OF THE INVENTION

1. Field of the Invention

This invention relates to a gap filler for advanced aircraft and, more particularly, to channel members positioned in the slots formed between adjacent aircraft panels to cover such slots so that aircraft provided with such channel members have improved laminar air flow thereover, fuel consumption, handling capabilities and electrical continuity, along with abated radar detection, sound and drag.

2. Description of the Background Art

In the field of aircraft, metallic plates are coupled or otherwise secured to a lower base structure as by Milson type fasteners, set screws or like mechanisms. The fasteners are removable to allow for access to internal aircraft components and for the replacement and/or repair of the individual plates.

Proper engineering design of aircraft requires that adjacent plates be spaced a small distance from each other to allow for expansion and/or contraction of the plates during extreme thermal conditions. Such spacing also allows for plate shifting during the maneuvering of the aircraft when in operation and use. Unfortunately, however, the spacing between plates creates a discontinuous surface which interrupts the laminar airflow thereover resulting in undesirable sound, drag, poor fuel consumption and diminished handling capabilities. In addition, the plates are normally electrically conductive creating electrical discontinuities at the gaps which are detectable by radar. This is because the discontinuous electrical surfaces, as created by the spacing between plates, increases electrical interference when reflecting radar waves. This increases the detectability of the aircraft by radar. A discontinuous electrical flow also is ineffective for lightning discharge.

Various devices and techniques for covering gaps are either employed commercially or are disclosed in the patent literature. For example, in U.S. Pat. No. 4,258,889, Hunt discloses a non-elastic compressible insert for aircraft panel gaps comprised of an aluminum alloy foam that is rolled into the gap; and in U.S. Pat. No. 3,174,711, Sullivan shows a one piece gap filler of a compliant material. Jonas, in U.S. Pat. No. 4,671,470, uses a foam filler. In Barker, U.S. Pat. No. 3,233,238, a dielectric material is utilized around ports in a vehicle to reduce radar detectability. Lastly, Rosenhain in U.S. Pat. No. 1,322,328, shows a fillet used to shape an aircraft wing joint so that the outer surface is smooth.

From a commercial standpoint, the most common technique for filling gaps is to utilize a sealant, caulking agent or other filler material as of high temperature silicone, urethane or the like. The filler material is loaded with an electromagnetic additive of a heavy metal such as nickle, silver, gold, ferrous metal or the like. Such filler material provides the desired electrical conductivity to abate electrical discontinuity. Unfortunately, such filler materials are expensive, heavy and bulky and cause galvanic corrosion. Further, the technique for using filler material is expensive since it is time consuming and requires the training of skilled personnel. Even then such technique can result in scratching of adjacent panels during the filling of gaps or the removal of filler material therefrom during maintenance and repair.

As evidenced by the great number of prior patents and commercial devices and techniques, efforts are continuously being made in an attempt to improve panel gap fillers. Such efforts are being made to render such panel gap fillers more efficient, reliable, inexpensive and convenient to manufacture, install and use. None of these previous efforts, however, provides the benefits attendant with the present invention. Additionally, the prior patents and commercial devices and techniques do not suggest the present inventive combination of component elements arranged and configured as disclosed and claimed herein.

The present invention achieves its intended purposes, objects, and advantages through a new, useful and nonobvious combination of component elements, with the use of a minimum number of functioning parts, at a reasonable cost to manufacture, and by employing only readily available materials.

Therefore, it is an object of this invention to provide an improved gap filler positionable in and across a gap formed between aircraft panels, the gap filler including a horizontal portion extending across the gap and a vertical portion extending therefrom into the gap, the vertical portion having edges in frictional contact with the side walls of the gap to resist removal of the gap filler from the gap, the gap filler being formed of an electrically conductive material selected to preclude galvanic corrosion when in contact with the panels.

A further object of the invention is to minimize galvanic corrosion between adjacent aircraft panels by the use of improved seals.

It is a further object of this invention to simplify the design and usage of aircraft gap seals.

It is a further object of the present invention to improve the laminar flow of air adjacent to aircraft.

It is a further object of this invention to abate undesirable sound and drag of an aircraft.

It is a further object of this invention to improve fuel consumption and handling capabilities of an aircraft.

Lastly, it is an object of the present invention to preclude detection of aircraft by radar through the covering of gaps between adjacent aircraft panels.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiments shown in the attached drawings. For the purpose of summarizing the invention, the invention may be incorporated into a gap filler positionable in and across a gap formed between aircraft panels, the gap filler including a horizontal portion extending across the gap and a vertical portion extending therefrom into the gap, the vertical portion having edges in frictional contact with the side walls of the gap to resist removal of the gap filler from the gap, the gap filler being formed of an electrically conductive material selected to preclude galvanic corrosion when in contact with the panels.

The vertical portion is formed of a pair of downwardly extending legs integrally formed with the horizontal portion. A central extent of each leg includes an outwardly directed bight in frictional contact with a side wall of an associated panel. The gap filler further includes slots in the legs extending upwardly from their lower edges at spaced locations along the lengths of the legs. The gap filler further includes a circular aperture at the top of each slot. The gap filler further includes an upper horizontal component in contact with the adjacent plates at their exterior surfaces. The vertical portion is a centrally disposed member with slits forming cutout tongues which extend upwardly and outwardly in frictional contact with the side walls of the panels. The vertical portion is a centrally disposed member with upwardly and outwardly directed members extending from the sides of the centrally disposed member in frictional contact with the side walls. The upwardly and outwardly directed members include a plurality of such members extending from each side of the centrally disposed member. The vertical portion is formed of an upper part fabricated of an electrically conductive material and a lower part fabricated of an elastomeric material.

The invention may be incorporated into improved channel members, formed of panels with gaps between the panels, the improved channel members being positionable over and in the gaps between aircraft panels, each channel member including a gap filler including a horizontal portion extending across the gap and a vertical portion extending downwardly therefrom into a gap, the vertical portion having parts in frictional contact with the side walls of the gap to resist removal of the gap filler from the gap, the gap filler being formed of an electrically conductive material selected to preclude galvanic corrosion when in contact with the panels.

The vertical portion is formed of a pair of downwardly extending legs integrally formed with the horizontal portion. A central extent of each vertical portion includes an outwardly directed bight in frictional contact with a side wall of an associated panel. The channel member further includes an upper horizontal component in contact with adjacent plates at their exterior surfaces. The upper horizontal component is fabricated of the same material as the panels.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which:

FIG. 1 is an exploded perspective illustration of adjacent plates forming the external skin of an aircraft removably coupled to a substructure with a gap in between the plates and with a channel member for filling the gap.

FIG. 2 is an enlarged perspective illustration of the channel member shown in FIG. 1.

FIGS. 3 and 4 are channel members constructed in accordance with alternate embodiments of the invention.

FIGS. 5 and 6 are sectional views of the channel member of the FIG. 1 embodiment, first positioned adjacent to, and then positioned within, the gap.

FIGS. 7 and 8 are sectional views of the channel member of the FIG. 2 embodiment, first positioned adjacent to, and then positioned within, the gap.

FIGS. 9 and 10 are sectional views of the channel member of the FIG. 3 embodiment, first positioned adjacent to, and then positioned within, the gap.

FIGS. 11, 12 and 13 illustrate yet another alternate embodiment of the invention wherein the member for filling the gap is formed of two parts.

FIGS. 14 through 19 illustrate the steps in fabricating the seal of an alternate embodiment of the present invention.

Similar reference characters refer to similar parts throughout the several Figures.

DETAILED DESCRIPTION OF THE INVENTION

FIG. 1 illustrates adjacent plates 10 forming the external skin of a portion of an aircraft. The plates are removably coupled to a substructure 12 with a gap 14 located between the plates 10. The plates are metallic and coupled to a lower base structure by removable fasteners 16 as of the Milson type, set screws or like mechanisms. The fasteners are removable to allow access to internal aircraft components or for the replacement and/or repair of the individual plates. Adjacent plates are spaced a small distance from each other to allow for expansion and/or contraction during extreme thermal conditions. Such spacing also accommodates plate shifting during the maneuvering of the aircraft.

The gaps 14 or spacing between plates creates a discontinuous surface. Without a gap filler, the gaps would interrupt the laminar airflow thereover. This results in undesirable sound, drag, poor fuel consumption and diminished handling capabilities. All of these shortcomings are overcome by the use of the channel members 20 of the present invention. In addition, the plates 10 are normally electrically conductive whereby electrical discontinuities would occur at the gaps if not properly filled rendering the aircraft more detectable by radar. The discontinuous electrical surfaces, as created by the spacing between plates, increases electrical interference for more readily reflecting radar waves. This increases the detectability of the aircraft by radar. The electrical discontinuity also precludes proper lightning discharge. The use of the seals of the present invention abates electrical discontinuities to thereby reduce detection by radar and increases lightning discharge.

The primary embodiment of the invention is shown in FIGS. 1, 2, 5, and 6. In this embodiment, a channel member 20 is fabricated, preferably by extrusion, to include a centrally disposed upper horizontal portion 24 and depending means formed as essentially vertical portions constituting side walls 26 including upper and lower portions 30 and 32. The side walls have bends extending downwardly and outwardly from the edges of the upper horizontal portion 24 and then, at an intermediate location, are bent inwardly to form an elongated central bight 34. Contact and electrical continuity occurs between the channel member 20 and the interior surface of the gap 14 at the bight 34. An upper elongated horizontal plate 36 is attached to the horizontal portion 24 of the channel member 22.

Formed into the side walls 26 of the channel member 20, following its extrusion, are slots 40 extending upwardly from the lower most edge of the side walls 22 to a point just short of the upper horizontal portion 24. These slots have an enlarged circular portion 42 at their uppermost extents to facilitate bending for accommodating expansion and contraction as occurs during extreme thermal conditions and/or during maneuvering of the aircraft during operation and use. Such bending may be in a direction tending to move the channel member 22 out of the gap 14 or it may be transverse with respect thereto towards or away from one of the side walls of the gap 14. Such slots 40 and circular apertures 42 facilitate the bending of the channel member for these purposes.

The configuration of the channel members 20 of all embodiments of the present invention has added benefit over known techniques, such as loaded filler materials. Since the channel members 22 are usually inserted and removed by unskilled technicians, a simple screw driver may by readily used for such purposes. Unlike prior techniques, the task is simple and quick, snap in and snap out, which will not result in the inadvertent scratching of a panel surface.

In one modification of the primary embodiment the upper horizontal plate 36 may be eliminated. The elimination of the upper plate is utilized when the plates 10 forming the gap 14 as well as the channel members 20 are fabricated to extremely close tolerances. This minimizes the discontinuity of the aircraft surface at the edges of the gaps. The space between the channel member 20 and walls of the gap 14 may be left empty or filled with a caulk-like material for the benefits attendant with the other embodiments.

The FIG. 3 embodiment includes a chanel member 52 of a generally a "T" shaped cross sectional configuration. Its central vertical portion 54 is centrally located and slightly less than the depth of the gap. Note FIG. 8. As in the primary embodiment, an upper horizontal portion 56 rests on the aircraft panels 10 adjacent to the edges of the gap 14 to cover the gap 14 and adjacent fasteners 16. Slits 58 configured as inverted U-shapes are formed at space intervals along the vertical portions forming tongues 60. The adjacent tongues 60 formed by such slits are bent in opposite directions facing upwardly and outwardly. When the channel members 52 are positioned in the gaps 14, their upper edges 62 act to resist the forces tending to withdraw the channel members from the gaps. Note FIG. 8.

The FIG. 4 embodiment functions similarly to the FIG. 3 embodiment. Such embodiment includes a one piece channel member 66, a plurality of tongues 68 or frictional retention members sequentially formed on each side of the central vertical support 70, one above the other. Three such tongues are shown on each side of the vertical support 70 but any number, more or less, could readily be utilized. The tongues extend upwardly and outwardly in a symmetric orientation to resist removal of the channel members from the gap. A symmetric upper horizontal portion 72 functions as in the prior embodiments. Note FIGS. 9 and 10.

In all of the above referred to embodiments, the channel members are fabricated of a material the same as that of the aircraft panels with which they are to be utilized. Galvanic corrosion is thus abated since the same materials have the same electrical conductivity and electromotive capabilities. If the aircraft panels are titanium, the channel members are fabricated of titanium; if the aircraft panels are aluminum, the channel members are fabricated of aluminum; if the aircraft panels are of a carbon composite material, the channel members are fabricated of a carbon composite material; etc. Without like materials in contact with each other, galvanic corrosion would occur decreasing the effectiveness and life of the aircraft panels an well as the channel members.

In the final embodiment as shown in FIGS. 11, 12, and 13, the channel member 76 includes two parts, a first or uppermost T-shaped member 78 fabricated in one piece. Again it is of the same material as the panels. The lower vertical extent 80 of the T is enlarged to form a circular bead 82. The second part or seating member 84 of the assembly is an extruded elastomer with, at its lower extent 86, tongues 88 and with, at its upper extent, a central circular slot 90 and upper slit 92 thereabove. The bead 82 is press fit into the slit 92 of the elastomeric seating member into slot 90. After fully depressed the sealing member reforms to the shape as shown in FIG. 12. The channel member 76 and seating member 84 thus form a unitary assembly of two mating parts. The unitary sealing assembly is then pressed into the gap for forming the seal as in the prior embodiments. Note FIG. 13. Suitable materials for the seating member 84 include high temperature silicone rubber, polyurethane rubber, polyamides, polyimides, polyetherether keytones, polythioethers, and equivalent elastomers.

As an alternate to extrusion as preferably employed in fabricating the prior embodiments, fabrication of a channel member 22 may be effected by first forming a strip of channel member material 46 elongated to a length at least as long as the length of the longest gap to be filled. Note FIGS. 14 through 19. The width of the strip is equal to that of the finally formed channel member. The strip is then cut or stamped to form the enlarged circular cut-outs 42 then cut or stamped to form the slots 40. The channel member is then bent along the edges 48 defining the upper horizontal portion 24 and then bent to form the bights 34 to thereby form the channel member 20 as illustrated. The upper horizontal plate 30 is separately formed then spot welded to the upper horizontal portion of the channel member in the region where the upper edges of the side walls contact the horizontal plate. All of the above method steps are preferably done in a continuous and automatic cycle of operation.

In all of the above referred to embodiments, the channel members are fabricated of a material correlated with that of the aircraft panel with which they are to be utilized so as to abate galvanic corrosion. If the materials in contact with each other were not correlated, galvanic corrosion would occur decreasing the effectiveness and life of the aircraft panels as well as the channel members. The shape of the channel members, in all of the above described embodiments, provides a smooth surface, devoid of gaps, which functions to reduce undesirable noise, drag, increase fuel consumption, and improve handling capabilities. The electrical conductivity of the channel members couples the panels on opposite sides of the gaps thus abating electrical discontinuities at the gaps between panels rendering the aircraft less detectable by radar and more capable of discharging lightning.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described, what is claimed is:

1. A gap filler positionable in and across a gap formed between adjacent side edges of adjacent aircraft panels, the gap filler including a horizontal portion extending across the gap and a vertical portion extending therefrom into the gap, the vertical portion having edges in frictional contact with the side walls of the gap to resist removal of the gap filler from the gap, the gap filler being formed of an electrically conductive material selected to preclude galvanic corrosion when in contact with the panels and to abate electrical discontinuities at the gaps between the panels, thereby reducing aircraft detecability by radar and improving lighting strike tolerance.

2. The gap filler as set forth in claim 1 wherein the vertical portion is formed of a pair of downwardly extending legs integrally formed with the horizontal portion.

3. The gap filler as set forth in claim 2 wherein a central extent of each leg includes an outwardly directed bight in frictional contact with a side wall of an associated panel.

4. The gap filler as set forth in claim 3 and further including slots in the legs extending upwardly from their lower edges at spaced locations along the lengths of the legs.

5. The gap filler as set forth in claim 4 and further including circular aperture at the top of each slot.

6. The gap filler as set forth in claim 2 and further including an upper horizontal component in contact with the adjacent plates at their exterior surfaces.

7. The gap filler as set forth in claim 1 wherein the vertical portion is a centrally disposed member with slits forming cutout tongues which extend upwardly and outwardly in frictional contact with the side walls of the panels.

8. The gap filler as set forth in claim 1 wherein the vertical portion is a centrally disposed member with upwardly and outwardly directed members extending from the sides of the centrally disposed member in frictional contact with the side walls.

9. The gap filler as set forth in claim 8 wherein the upwardly and outwardly directed members include a plurality of such members extending from each side of the centrally disposed member.

10. The gap filler as set forth in claim 8 wherein the vertical portion is formed of an upper part fabricated of an electrically conductive material and a lower part fabricated of an elastomeric material.

11. For use with an aircraft having an exterior surface formed of panels with gaps between adjacent side edges of the panels, improved channel members positionable over and in the gaps between aircraft panels, each channel member including a gap filler including a horizontal portion extending across the gap and a vertical portion extending downwardly therefrom into a gap, the vertical portion having parts in frictional contact with the side walls of the gap to resist removal of the gap filler from the gap, the gap filler being formed of an electrically conductive material selected to preclude galvanic corrosion when in contact with the panels and to abate electrical discontinuities at the gaps between the panels thereby reducing aircraft detecability by radar and improving lighting strike tolerance.

12. The channel member as set forth in claim 11 wherein the vertical portion is formed of a pair of downwardly extending legs integrally formed with the horizontal portion.

13. The channel member as set forth in claim 12 wherein a central extent of each vertical portion includes an outwardly directed bight in frictional contact with a side wall of an associated panel.

14. The channel member as set forth in claim 13 and further including an upper horizontal component in contact with adjacent plates at their exterior surfaces.

15. The channel member as set forth in claim 14 wherein the upper horizontal component is fabricated of the same material as the panels.

* * * * *